United States Patent
Fazekas

(10) Patent No.: US 10,882,365 B2
(45) Date of Patent: Jan. 5, 2021

(54) SYSTEM FOR INFLATING—DEFLATING A TYRE

(71) Applicant: Teleflow SAS, Mably (FR)

(72) Inventor: Stéphane Fazekas, Noailly (FR)

(73) Assignee: Teleflow SAS, Mably (FR)

( * ) Notice: Subject to any disclaimer, the term of this patent is extended or adjusted under 35 U.S.C. 154(b) by 323 days.

(21) Appl. No.: 16/070,786

(22) PCT Filed: Jan. 11, 2017

(86) PCT No.: PCT/FR2017/050058
§ 371 (c)(1),
(2) Date: Jul. 18, 2018

(87) PCT Pub. No.: WO2017/125664
PCT Pub. Date: Jul. 27, 2017

(65) Prior Publication Data
US 2020/0031177 A1    Jan. 30, 2020

(30) Foreign Application Priority Data
Jan. 19, 2016 (FR) ...................................... 16 50391

(51) Int. Cl.
*B60C 23/00* (2006.01)
*F16K 11/048* (2006.01)
(Continued)

(52) U.S. Cl.
CPC .......... *B60C 23/004* (2013.01); *F16K 11/048* (2013.01); *F16K 11/18* (2013.01); *F16K 31/122* (2013.01); *F16K 31/1225* (2013.01)

(58) Field of Classification Search
CPC ...... B60C 23/004; F16K 11/048; F16K 11/18; F16K 31/122; F16K 31/1225
See application file for complete search history.

(56) References Cited

U.S. PATENT DOCUMENTS

| 4,922,946 A | * | 5/1990 | Boulicault | ............ | B60C 23/003 |
| | | | | | 137/102 |
| 10,017,010 B2 | * | 7/2018 | Bowman | ............... | B60C 23/004 |

(Continued)

FOREIGN PATENT DOCUMENTS

| DE | 29718420 U1 * | 12/1997 | ........... B60C 23/066 |
| EP | 2755830 | 11/2015 | |

(Continued)

OTHER PUBLICATIONS

International Search Report and the Written Opinion dated Mar. 31, 2017 From the International Searching Authority Re. Application No. PCT/FR2017/050058 and Its Translation of Search Report Into English. (10 Pages).

*Primary Examiner* — Kip T Kotter

(57) ABSTRACT

The present invention relates to an inflation—deflation system comprising a reserve of air and a valve carried on board the wheel, the air being confined to the reserve under pressure higher than that of the tyre, the valve is in communication with the reserve and the tyre and comprises control means able to adopt: —a rest position in which they ensure stable and hermetic communication between the tyre and the valve; —an inflation position in which they provide communication between the tyre and the reserve, by being moved by air injected by means of an inflation electrically operated valve connected to the reserve; —a deflation position in which they provide communication between the tyre and the external air, by being moved by air injected by a deflation electrically operated valve connected to the reserve.

6 Claims, 3 Drawing Sheets

(51) Int. Cl.
    *F16K 11/18*         (2006.01)
    *F16K 31/122*      (2006.01)

(56) References Cited

U.S. PATENT DOCUMENTS

| | | | | |
|---|---|---|---|---|
| 2002/0059972 | A1* | 5/2002 | Rheinhardt | B60C 23/004 152/418 |
| 2005/0081973 | A1* | 4/2005 | Marin-Martinod | B60C 23/004 152/415 |
| 2009/0009310 | A1* | 1/2009 | Caretta | B60C 23/004 340/442 |
| 2010/0300591 | A1* | 12/2010 | Rheinhardt | B60C 23/004 152/427 |
| 2015/0075642 | A1* | 3/2015 | Fazekas | B60C 23/003 137/224 |
| 2017/0240006 | A1* | 8/2017 | Stuckey | B60O 5/22 |
| 2019/0016182 | A1* | 1/2019 | Balistreri | F16K 11/105 |

FOREIGN PATENT DOCUMENTS

| | | |
|---|---|---|
| FR | 2834671 | 7/2003 |
| WO | WO 2017/125664 | 7/2017 |

* cited by examiner

SYSTEM FOR INFLATING—DEFLATING A TYRE

RELATED APPLICATIONS

This application is a National Phase of PCT Patent Application No. PCT/FR2017/050058 having International filing date of Jan. 11, 2017, which claims the benefit of priority of French Patent Application No. 1650391 filed on Jan. 19, 2016. The contents of the above applications are all incorporated by reference as if fully set forth herein in their entirety.

TECHNICAL FIELD AND BACKGROUND OF THE INVENTION

The invention relates to the technical sector of inflation-deflation systems of a tyre, notably controlled remotely from the compartment of a vehicle for example.

Said inflation-deflation systems make it possible to be able to regulate the air pressure of the tyres from inside the vehicle by means of a simple interaction with a control interface. This is very useful for vehicles of the rally, military, agricultural or civilian type. These systems are generally designed for all drivers of vehicles having the need to vary the pressure of the tyres in order to adapt to the surfaces upon which they are moving, to the loads that they are carrying, and to the speed of travel of the vehicle.

Known from the prior art are controlled inflation-deflation devices, in particular described within the European patent applications EP 0,511,135 and EP 2,755,830.

The devices described in these patent applications comprise arrangements that make it possible, using a compressor connected to an air intake, to inject air at low or high pressure in order to move a set of valves and to inflate the tyre. Conversely, when air is injected at high or low pressure, a set of valves is moved and the tyre is brought into communication with the outside air and is deflated.

These devices are entirely satisfactory when it comes to inflating tyres at low or high pressure. However, a disadvantage of these devices lies in the fact that the flow of air injected by means of the compressor, and which makes it possible to drive the valves, is also used to inflate the tyre.

Thus, this requires the arrangement of a compressor and a flexible air passageway associated with a rotating union between the compressor and the inflation-deflation device mounted on the tyre. The presence of the rotating union entails the risks of leaks. The arrangement of the rotating union is particularly complex and must be in the presence of a lubricant.

SUMMARY OF THE INVENTION

The problem that the invention aims to solve is therefore to provide an inflation-deflation system of a tyre that comprises a wheel that makes it possible to dispense with the arrangement of a rotary union.

A further objective of the invention is to provide such a system which is both simple in design and self-contained.

To solve such a problem, a system for inflating-deflating a tyre has been designed and developed that comprises a wheel; said system is remarkable in that it comprises a reserve of air and a valve carried on board the wheel, the air being confined to the reserve under pressure higher than that of the tyre, the valve is in communication, on the one hand, with the reserve and, on the other hand, with the tyre, said valve comprises control means able to adopt:

- a resting position in which said control means ensure stable and hermetic communication between the tyre and the valve;
- an inflation position in which said control means provide communication between the tyre and the reserve, by being moved by air injected into the valve by means of an inflation electrically operated valve connected to the reserve;
- a deflation position in which said control means provide communication between the tyre and the external air, by being moved by air injected by a deflation electrically operated valve connected to the reserve.

In this way, the system according to the invention allows for the inflation-deflation of a tyre by means of a valve connected to a reserve of air carried on board the wheel and makes it possible to be free of the implementation of a rotating union. The system is simpler and the risks of leakage are reduced.

The system according to the invention is used to control the inflation by means of an inflation electrically operated valve, and to control the deflation by means of a deflation electrically operated valve. These electrically operated valves make it possible, by injecting a small volume of air, to place the tyre in communication with the reserve in order to inflate said tyre, or with the exterior of the valve for deflation.

In other words, the flow of air used to control the inflation-deflation is separate from the flow of air injected into the tyre for inflating it as such.

Since the control of the valve for inflation-deflation is carried out by means of the injection of low volumes of air, it is possible to use electrically operated valves of low power and low electrical power consumption. The power supply for said electrically operated valves is self-contained and can be by means of batteries or rechargeable batteries.

According to an advantageous characteristic of the invention, and in order to render the system controllable remotely, the electrically operated valves are controlled by means of a wireless transceiver system. Of course, any type of wireless control can be considered within the scope of the invention, the electrically operated valves can be radio-controlled or controlled by various well-known wireless communication standards of the state of the art, such as "LTE", "NFC", "Bluetooth", "Wi-Fi", etc., that must be considered transceiver systems according to the interpretation of the present invention.

According to a particular embodiment of the system according to the invention, the valve comprises a hollow body comprising:

- a main chamber in communication with the tyre;
- a discharge chamber comprising at least one venting port and in communication with the main chamber;
- a secondary chamber in communication with the reserve of air;
- a first valve arranged inside the main chamber for closing the communication with the discharge chamber;
- a second valve arranged for directly or indirectly closing the communication between the main chamber and the secondary chamber;
- an inflation valve connected to the inflation electrically operated valve;
- a deflation valve connected to the deflation electrically operated valve.

Based upon this particular embodiment, several examples of implementation of the valve may be considered.

According to a first exemplary implementation of the valve:

the discharge chamber venting port is closed by means of a discharge valve movable to an open position against an elastic return member;

the second valve is arranged inside the discharge chamber, which is in the form of an intermediate chamber, which is also in communication with the secondary chamber;

the valve comprises a third valve arranged inside the secondary chamber for closing the communication with the discharge chamber;

the first, second and third valves are connected to each other and connected to first and second pistons arranged within a common chamber;

the inflation port opens out into the common chamber between the first and second pistons, and the deflating port opens out between the second piston and the common chamber such that:

the air injected by means of the inflation electrically operated valve causes the movement of the first piston and leads to the opening of the first and second valves, against an elastic return member, in order to allow for the inflation of the tyre;

the air injected by means of the deflation electrically operated valve causes the movement of the second piston, which further moves the first piston in such a way as to lead to the closing of the third valve and the opening of the discharge valve, which is pushed by the second valve in order to allow for the deflation of the tyre.

According to a second exemplary implementation of the valve:

the second valve is arranged within the main chamber, which is in direct communication with the secondary chamber, and is connected to a first piston arranged within an inflation chamber into which the inflation port opens out in such a way that the air injected by the inflation electrically operated valve causes the movement of the first piston and the opening of the second valve and allows for the inflation of the tyre;

the first valve is connected to a second piston arranged within a deflation chamber into which the deflation port opens out in such a way that the air injected by means of the deflation electrically operated valve causes the movement of the second piston and the opening of the first valve and allows for the deflation of the tyre;

the valve comprises an elastic return member arranged between the first and second valves in order to keep them in the resting and closed position.

Advantageously, and in order to allow the system to measure the tyre pressure, to measure the pressure in the reserve of air, or to calculate the inflation-deflation duration, said system comprises a pressure sensor connected to the transceiver system in communication with the main chamber.

BRIEF DESCRIPTION OF THE SEVERAL VIEWS OF THE DRAWINGS

Other advantages and characteristics will better emerge from the following description of the invention, provided by way of a non-limiting example, of a measurement device, based upon the appended drawings, wherein.

DESCRIPTION SPECIFIC EMBODIMENTS OF THE INVENTION

Figure 1:
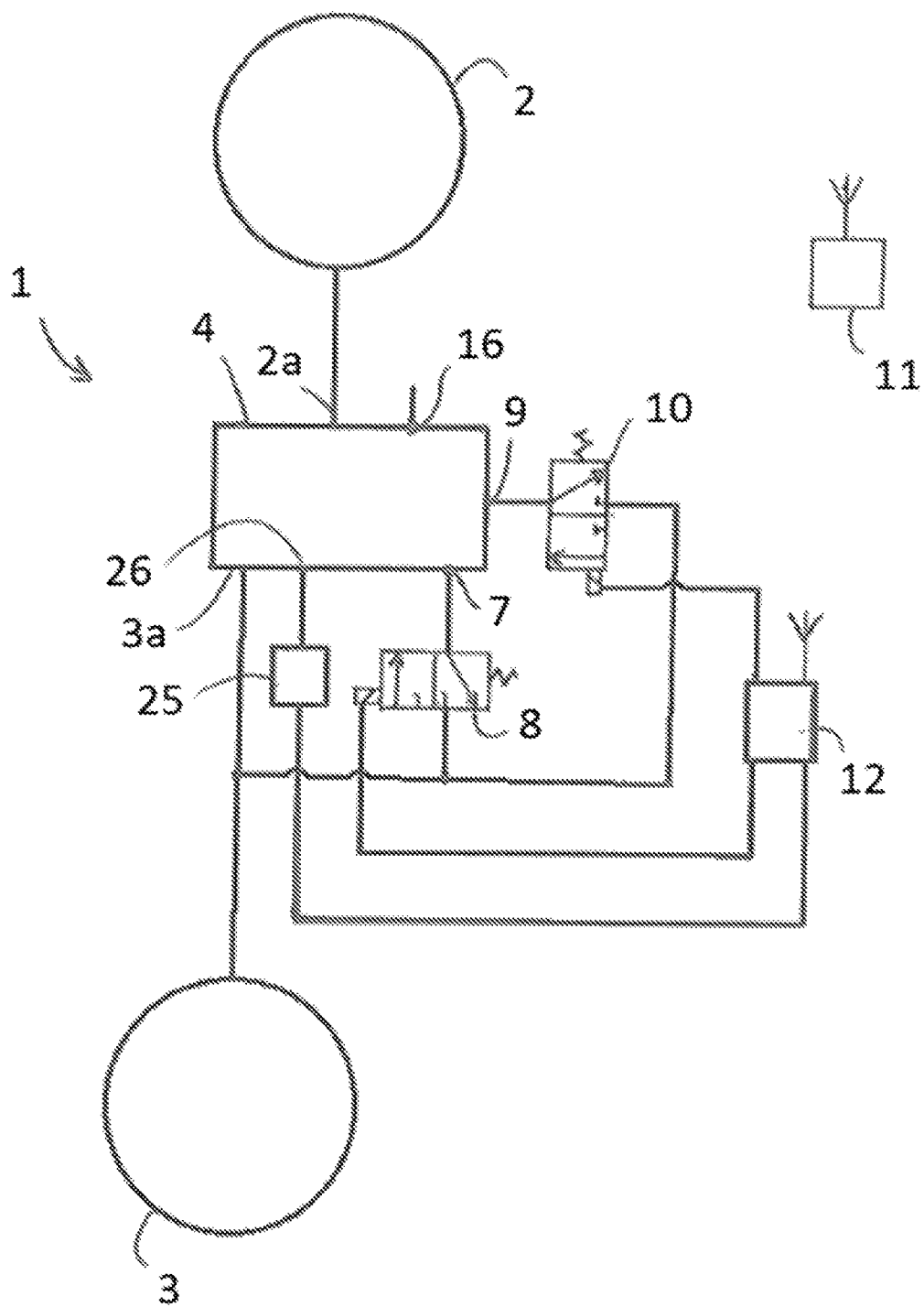
FIG. 1 illustrates a block diagram of the inflation-deflation system according to the invention.

Referring to FIG. 1, the invention concerns a system (1) for the inflation—deflation of a tyre (2) that comprises a wheel, using a reserve of air (3) confined under pressure higher than that of the tyre (2).

The reserve of air (3) is carried on board the wheel of the tyre (2) and in particular can be arranged within said tyre (2).

The system (1) comprises a valve (4), also carried on board the wheel, in the form of a hollow body (4a) comprising a main chamber (5) in communication with the tyre (2) by means of an intake (2a) and a secondary chamber (6) in communication with the reserve (3) by means of an intake (3a).

The valve (4) comprises an inflation port (7) connected to an inflation electrically operated valve (8) and a deflation port (9) connected to a deflation electrically operated valve (10). The electrically operated valves (8, 10) are radio-controlled by means of a transceiver system (11, 12) for remotely controlling the inflation-deflation, in particular from a control panel arranged for example within the compartment of the vehicle within which the system (1) is installed.

According to the invention, the valve (4) comprises control means consisting of an arrangement of valves and pistons able to adopt:

a resting position wherein said control means render the connection between the tyre (2) and the valve (4) hermetic;

an inflation position in which said control means place the tyre (2) in communication with the reserve (3), by being moved by the air injected into the valve (4) by means of the inflation electrically operated valve (8) connected to the reserve (3);

a deflation position in which said control means place the tyre (2) in communication with the exterior of the valve, by being moved by the air injected by means of the deflation electrically operated valve (10) connected to the reserve (3).

Figure 2:
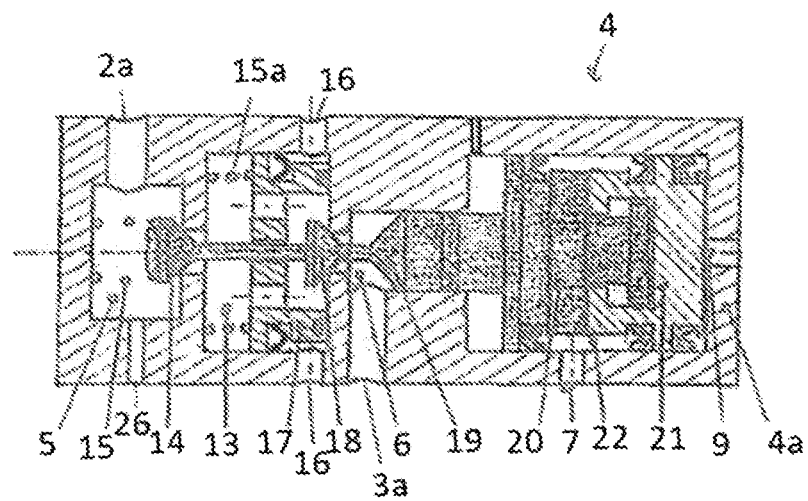
FIG. 2 is a longitudinal sectional view of a first exemplary implementation of the valve, the valve being shown in the resting position.
Figure 3:
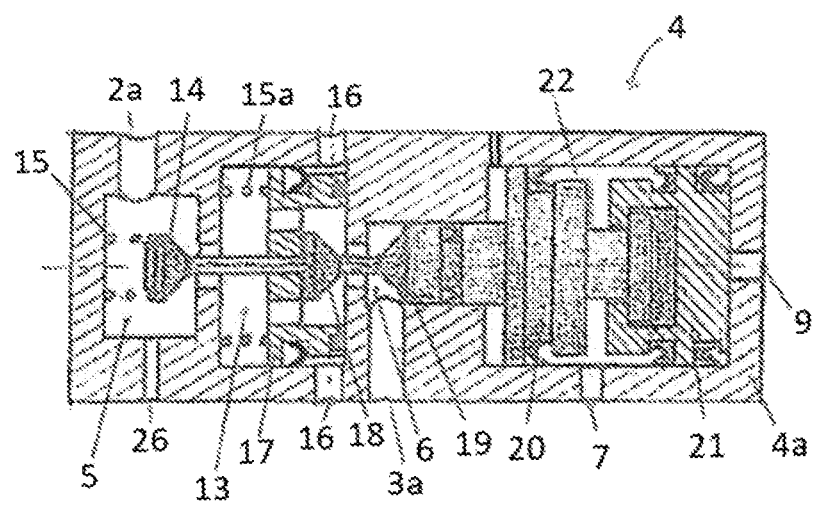
FIG. 3 is a longitudinal sectional view similar to that of FIG. 2, the valve being shown in the inflated position.
Figure 4:
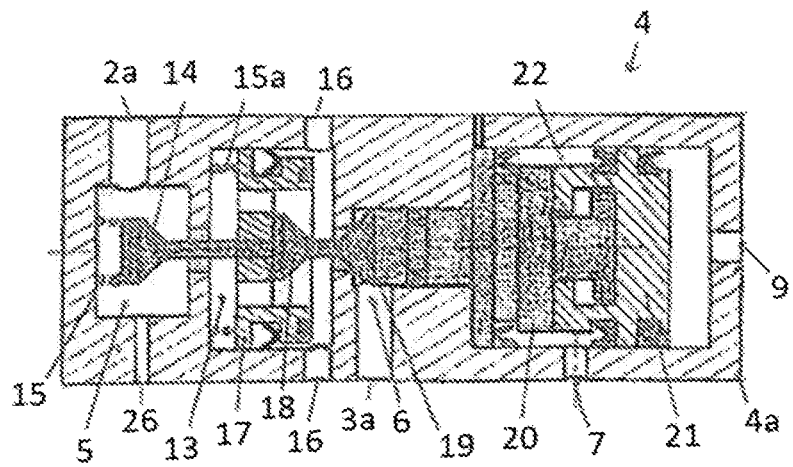
FIG. 4 is a longitudinal sectional view similar to that of FIG. 2, the valve being shown in the deflated position.

According to a first embodiment of the valve (4) of the device according to the invention, illustrated in FIGS. 2 to 4, the main chamber (5) is arranged at one end of the hollow body (4a). The valve (4) then comprises a discharge chamber (13).

Referring to FIG. 2, which illustrates the resting position of the valve (4), the main chamber (5) and the discharge chamber (13) communicate with each other by means of a port that is closed by a first valve (14) arranged inside said main chamber (5).

The first valve (14) is mounted movable within the main chamber (5) between a resting position wherein it closes the communication with the discharge chamber (13) and an open position, against an elastic return member (15) mounted inside the main chamber (5).

The discharge chamber (13) comprises at least one venting port (16) closed by a discharge valve (17) movable to an open position against an elastic return member (15a) arranged within the discharge chamber (13).

The discharge chamber (13) is arranged between the main chamber (5) and the secondary chamber (6), and is regarded as an intermediate chamber. The secondary chamber (6) is then arranged within the valve (4) in communication, by means of a port, with the discharge chamber (13). The port is closed by a second valve (18) arranged inside the discharge chamber (13) and movable between a resting position wherein it closes the opening, an open position, and a discharge position wherein it pushes the discharge valve (17) to the open and venting position. The secondary chamber (6) is connected to the reserve of air (3) for inflating the tyre (2).

The secondary chamber (6) comprises a third valve (19) arranged inside the secondary chamber (6) for closing the communication with the discharge chamber (13).

The first, second and third valves (14, 18, 19) are connected to each other and connected to first and second pistons (20, 21) arranged within a common chamber (22).

In this embodiment, the inflation port (7) opens out into the common chamber (22) between the first and second pistons (20, 21), and the deflation port (9) opens out into the common chamber (22) behind the second piston (21), i.e., opposite the first piston (20).

Thus, and with reference to FIG. 3, which illustrates the inflation position of the valve (4), the air injected by means of the inflation valve (8) through the inflation port (7) causes the displacement of the first piston (20) and leads to the opening of the first and second valves (14, 18), against the elastic return member (15).

In this manner, given that the pressure inside the reserve (3) is greater than the pressure inside the tyre (2), the air present in the reserve (3) escapes and passes successively into the secondary chamber (6) into the discharge chamber (13) within the main chamber (5) and is injected into the tyre (2) for inflating it as such.

When air is no longer injected into the inflation port (7), the common chamber (22) is no longer under pressure. Under the effect of the pressure of the reserve (3) on the third valve (19), and of the pressure of the tyre (2) and of the elastic return member (15) on the first valve (14), the first piston (20) is pushed back to the original position thereof and the first and second valves (14, 18) are closed, which corresponds to the resting position of the valve (4).

With reference to FIG. 4, which illustrates the deflation position of the valve (4), the air injected by means of the deflation electrically operated valve (10) through the deflation port (9) causes the displacement of the second piston (21), which further moves the first piston (20) into a deflation position. In this position, the third valve (19) is moved to a position wherein it closes the communication between the secondary chamber (6) connected to the reserve (3), and the discharge chamber (13). The second valve (18) is moved to the discharge position, wherein it forces the opening of the discharge valve (17) of the discharge chamber (13) against the elastic return member (15a). The first valve (14) is also moved to the open position in such a way as to place the main chamber (5) in communication with the discharge chamber (13), wherein the venting port (16) is open. In this manner, the air present within the tyre (2) is discharged from the valve (4) and the tyre (2) is deflated.

When air is no longer injected, the common chamber (22) is no longer under pressure. Under the effect of the pressure of the reserve (3) on the third valve (19), the elastic members (15, 15a), and the pressure of the tyre (2), the first and second valves (14, 18) and the discharge valve (17) are closed, and the first and second pistons (20, 21) are pushed back into the original positions thereof, which corresponds to the position of rest of the valve (4).

Figure 5:
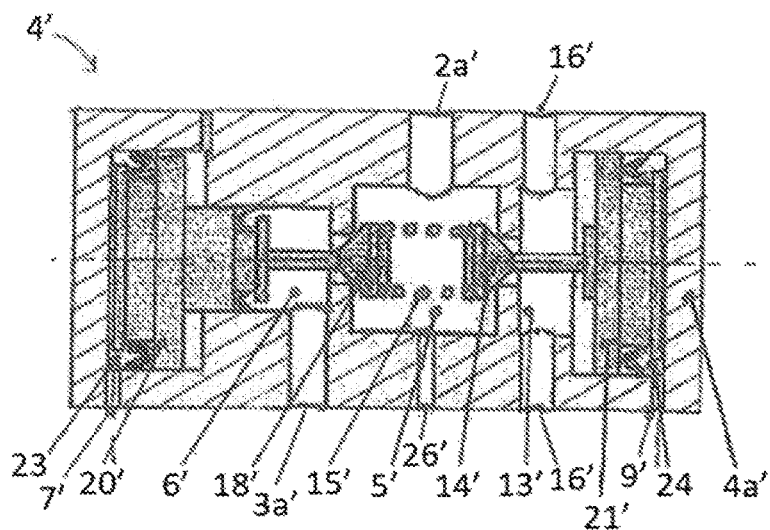
FIG. 5 is a view in longitudinal section of a second exemplary implementation of the valve, the valve being shown in the resting position.
Figure 6:
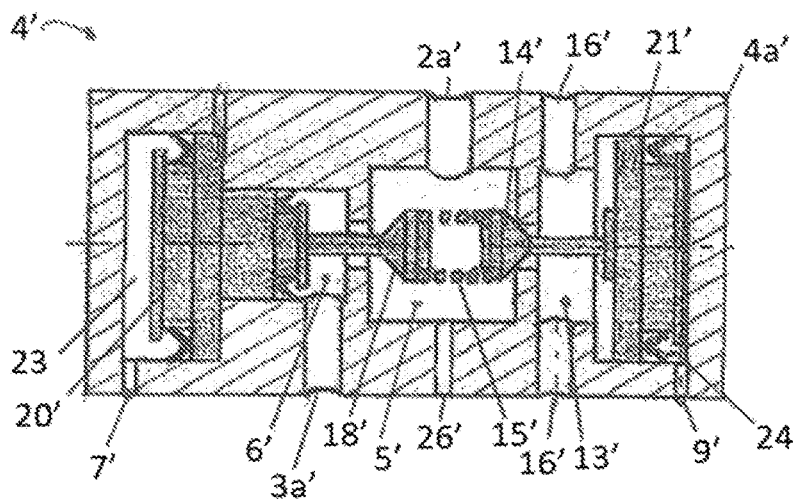
FIG. 6 is a longitudinal sectional view similar to that of FIG. 5, the valve being shown in the inflated position.
Figure 7:
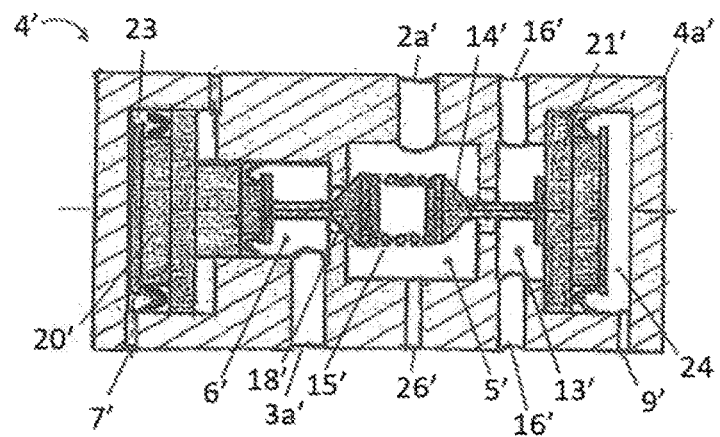
FIG. 7 is a longitudinal sectional view similar to that of FIG. 5, the valve being shown in the deflated position.

According to a second embodiment of the valve (4') of the device according to the invention, illustrated in FIGS. 5 to 7, the secondary (6') and discharge (13') chambers are arranged on either side of the main chamber (5').

The valve (4') comprises, at one end, an inflation chamber (23) receiving a first piston (20') and wherein the inflation port (7') opens out, and at the other end a deflation chamber (24) receiving a second piston (21') and wherein the deflation port (9') opens out.

The main chamber (5') in relation to the tyre (2) communicates on both sides by means of intermediate ports, with the secondary chamber (6') connected to the reserve (3) and the discharge chamber (13') comprising at least one venting port (16').

First and second valves (14', 18') are arranged inside the main chamber (5') and are able to adopt closed positions of the ports in order to close the communication between the main chamber (5') and the secondary (6') and discharge (13') chambers, and open positions, against an elastic return member (15') arranged between the first and second valves (14', 18').

The second valve (18'), which is arranged in order to close the communication with the secondary chamber (6'), is connected to the first piston (20') in such a way that the air injected by the inflation electrically operated valve (8) through the inflation port (7') into the inflation chamber (23) causes the movement of the first piston (20') and the opening of the second valve (18') and allows for the inflation of the tyre (2).

When air is no longer injected into the inflation port (7'), the inflation chamber (23) is no longer under pressure. Under the effect of the pressure of the reserve (3) on the first valve (20'), of the pressure of the tyre (2) and of the elastic return member (15'), the second valve (18') is closed and the first piston (20) is pushed back into the original position thereof corresponding to the resting position of the valve (4).

The first valve (14'), which is arranged in order to close the communication with the discharge chamber (13'), is connected to the first piston (21') in such a way that the air injected by means of the deflation electrically operated valve (10) into the inflation chamber (24) causes the movement of the first piston (21') and the opening of the first valve (14') and allows for the deflation of the tyre (2).

When air is no longer injected into the inflation port (9'), the deflation chamber (24') is no longer under pressure. Under the effect of the elastic return member (15') and of the pressure of the tyre (2), the first valve (14') is closed and the second piston (21') is pushed back into the original position thereof corresponding to the resting position of the valve (4').

Advantageously, a pressure sensor (25) is placed in contact with the main chamber (5, 5') by means of an inlet (26) and is connected to the transceiver system (11, 12). The pressure sensor (25) makes it possible, in the resting position of the valve (4, 4'), to measure the pressure within the tyre (2). Of course, a person skilled in the art will know how to adapt the nature of the pressure sensor to be implemented according to the embodiment of the invention operated.

During the inflation step, the sensor makes it possible to measure the pressure of the reserve (3) of the tyre (2) by knowing the pressure of the tyre (2) before inflation, taking into account any pressure losses before and after the sensor. The pressure measured by the sensor also makes it possible to estimate the inflation-deflation duration taking into account the known pressure losses of the valve (4 4'). Given that the sensor is connected to the transceiver system (11, 12), these measurements can be displayed within the vehicle compartment.

In this way, the system (1) according to the invention allows for the inflation-deflation of a tyre (2) by means of a valve (4, 4') connected to a reserve of air (3) carried on board the wheel and makes it possible to he free of the implementation of a rotating union and also an electrical connection between the wheel and the chassis of the vehicle. The system (1) is simpler and the risks of leakage are reduced.

The system (1) according to the invention makes it possible to control the inflation by means of an inflation electrically operated valve (8), and the deflation by means of a deflation electrically operated valve (10). These electrically operated valves (8, 10) make it possible, by injecting a specific volume of air, to place the tyre in communication with the reserve (3) in order to inflate said tyre (2), or with the exterior of the valve (4, 4') for deflation. The flow of air used to control the inflation-deflation is separate from the flow of air injected into the tyre (2) for the inflation thereof as such. The valve comprises an inlet (7, 7') for controlling the inflation, an inlet (9 9') for controlling the deflation, an intake inlet (3*an* 3*a'*) and an inflation inlet (2*a*, 2*a'*).

The system (1) according to the invention is self-contained and remotely controllable The control of the valve (4, 4') for inflation-deflation, carried out by the valves (8, 10), is achieved by injecting low volumes of pressurized air, thereby enabling the use of mini electrically operated valves of low power and low electrical power consumption. The supplying of power for said electrically operated valves (8, 10) can be performed by means of electrical batteries or rechargeable batteries.

What is claimed is:

1. A system for inflating-deflating a tyre that comprises a wheel, said system comprises a reserve of air and a valve carried on board the wheel, the air being confined to the reserve under pressure higher than that of the tyre, the valve is in communication, with the reserve and with the tyre, said valve comprises control means able to adopt:
   a resting position in which said control means ensure stable and hermetic communication between the tyre and the valve;
   an inflation position in which said control means provide communication between the tyre and the reserve, by being moved by air injected into the valve by means of an inflation electrically operated valve connected to the reserve, such that air injected into the tyre for inflating thereof being separate in flow from air injected into the valve for moving said control means;
   a deflation position in which said control means make it possible to place the tyre in communication with the exterior of the valve, by being moved by the air injected by means of a deflation electrically operated valve connected to the reserve.

2. The system (1) according to claim 1, wherein the electrically operated valves are controlled by means of a wireless transceiver system.

3. The system according to claim 1, wherein the valve comprises a hollow body comprising:
   a main chamber in communication with the tyre;
   a discharge chamber comprising at least one venting port and in communication with the main chamber;
   a secondary chamber in communication with the reserve of air;
   a first valve arranged inside the main chamber for dosing the communication with the discharge chamber;
   a second valve arranged for directly or indirectly closing the communication between the main chamber and the secondary chamber;
   an inflation port connected to the inflation electrically operated valve;
   a deflation port connected to the deflation electrically operated valve.

4. The system according to claim 3, characterized in wherein:
   the discharge chamber venting port is closed by means of a discharge valve movable to an open position against an elastic return member;
   the second valve is arranged inside the discharge chamber, which is in the form of an intermediate chamber, which is also in communication with the secondary chamber;
   the valve comprises a third valve arranged inside the secondary chamber for closing the communication with the discharge chamber;
   the first, second and third valves are connected to each other and connected to first and second pistons arranged within a common chamber;
   the inflation port opens out into the common chamber between the first and second pistons, and the deflating port opens out between the second piston and the common chamber such that:
   the air injected by means of the inflation electrically operated valve causes the movement of the first piston and leads to the opening of the first and second valves, against an elastic return member, in order to allow for the inflation of the tyre;
   the air injected by means of the deflation electrically operated valve causes the movement of the second piston, which further moves the first piston in such a way as to lead to the closing of the third valve and the opening of the discharge valve, which is pushed by the second valve order to allow for the deflation of the tyre.

5. The system according to claim 3, wherein:
   the second valve is arranged within the main chamber which is in direct communication with the secondary chamber, and is connected to a first piston arranged within an inflation chamber into which the inflation port opens out in such a way that the air injected by the inflation electrically operated valve causes the movement of the first piston and the opening of the second valve and allows for the inflation of the tyre;
   the first valve is connected to a second piston arranged within a deflation chamber into which the deflation port opens out in such a way that the air injected by the deflation electrically operated valve causes the movement of the second piston and the opening of the first valve and allows for the deflation of the tyre;
   the valve comprises an elastic return member arranged between the first and second valves in order to keep them in the resting and closed position.

6. The system according to claim 3, wherein the system comprises a pressure sensor connected to the transceiver system, in communication with the main chamber.

\* \* \* \* \*